(12) United States Patent
Itoi et al.

(10) Patent No.: US 8,525,490 B2
(45) Date of Patent: Sep. 3, 2013

(54) POWER SUPPLY DEVICE

(75) Inventors: Naoki Itoi, Chiyoda-ku (JP); Masayoshi Maeda, Himeji (JP); Nobuhiro Kihara, Chiyoda-ku (JP); Hiroshi Okuda, Chiyoda-ku (JP); Fumito Uemura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 473 days.

(21) Appl. No.: 12/946,392

(22) Filed: Nov. 15, 2010

(65) Prior Publication Data

US 2011/0286251 A1      Nov. 24, 2011

(30) Foreign Application Priority Data

May 18, 2010 (JP) .................................. 2010-113987

(51) Int. Cl.
*H02P 9/44* (2006.01)
*H02P 9/14* (2006.01)

(52) U.S. Cl.
USPC .............................................. 322/28; 322/99

(58) Field of Classification Search
USPC .................... 322/27, 28, 29, 37, 99
See application file for complete search history.

(56) References Cited

U.S. PATENT DOCUMENTS

| | | | | |
|---|---|---|---|---|
| 5,739,677 A | * | 4/1998 | Tsutsui et al. | ........................ 322/25 |
| 6,049,196 A | * | 4/2000 | Arai et al. | ........................ 322/61 |
| 8,405,365 B2 | * | 3/2013 | Nakada et al. | ........................ 322/28 |
| 8,415,930 B2 | * | 4/2013 | Kihara et al. | ........................ 322/28 |
| 8,415,931 B2 | * | 4/2013 | Kihara et al. | ........................ 322/99 |
| 8,421,422 B2 | * | 4/2013 | Itoi et al. | ........................ 322/28 |
| 2011/0101930 A1 | | 5/2011 | Itoi et al. | |

FOREIGN PATENT DOCUMENTS

| | | |
|---|---|---|
| JP | 02-007834 A | 1/1990 |
| JP | 2858008 B2 | 1/1990 |
| JP | 11-089111 A | 3/1999 |
| JP | 3409659 B2 | 3/1999 |
| JP | 2001-231180 A | 8/2001 |
| JP | 3489523 B2 | 8/2001 |
| JP | 2011-097739 A | 5/2011 |

\* cited by examiner

*Primary Examiner* — Nicholas Ponomarenko
(74) *Attorney, Agent, or Firm* — Sughrue Mion, PLLC

(57) ABSTRACT

A power supply device includes: a magneto generator with a rotor having a magnet; a torque supplying device supplying torque to the rotor; a rectifier circuit supplying electric power to a electrical load device by rectifying an output of the magneto generator; a short circuit electrically shorting an output end of the magneto generator; a voltage detection circuit detecting a terminal voltage of the electrical load device; and a control circuit controlling a voltage of the electrical load device to be a first set value by controlling the short circuit to switch ON (short operating mode) and OFF (rectification operating mode) according to the voltage detected by the voltage detection circuit and allowing the short circuit to operate while making a switching between the two operating modes according to a operating state relating to a rotation of the rotor of the magneto generator.

10 Claims, 5 Drawing Sheets

POWER SUPPLY DEVICE

BACKGROUND OF THE INVENTION

1. Field of the Invention

The present invention relates to a power supply device using a magneto alternating current (AC) generator.

2. Background Art

There are power supply devices using a magneto AC generator disclosed, for example, in Japanese Patents 3409659, 3489523, and 2858008. These power supply devices generally include a magneto AC generator, a rectifier circuit, and a power supply voltage control circuit. Electric power generated by the magneto AC generator is converted to a direct current (DC) in the rectifier circuit and inputted into the power generation voltage control circuit. In the power generation voltage control circuit, short control is performed to adjust a voltage to be the voltage of an electrical load formed, for example, of an electrical storage device. The electric power is then supplied to a electrical load device.

The power supply device using the magneto AC generator in the related art performs voltage control independently of an input torque to the magneto AC generator. An input torque to a rotor of the magneto AC generator, which is inputted from a torque supplying device (an engine in the case of an automobile) that supplies rotations to the rotor, varies with revolutions per minutes (rpm) on the rotor side. Hence, the generator in the power supply device in the related art does not necessarily generate electric power at an input torque suitable to a operating state of the rotor or the torque supplying device.

SUMMARY OF THE INVENTION

The invention was devised to solve the problem discussed above and has an object to provide a power supply device using a magneto AC generator that is capable of reducing an input torque to the magneto AC generator by making a switching between a rectifier circuit and a short circuit at an output end of the magneto AC generator according to a operating state of a rotor or a torque supplying device to reduce a operating load on the torque supplying device and hence to reduce energy for rotating the rotor necessary for the generator, thereby achieving power generation efficiency better than that of the related art.

A power supply device according to an aspect of the invention includes: a magneto generator that is formed of a rotor having a magnet that creates a magnetic field and a stator generating an AC at a stator winding by a rotation of the rotor; a torque supplying device that supplies torque to the rotor of the magneto generator; a rectifier circuit that supplies electric power to a electrical load device by rectifying the AC generated by the magneto generator to a DC; a short circuit that has an ON-and-OFF controllable switching element and electrically shorts an output end of the magneto generator when the switching element is switched ON; a voltage detection circuit that detects a terminal voltage of the electrical load device; and a control circuit that controls a voltage of the electrical load device to be a first set value by ON and OFF control on the switching element of the short circuit according to the voltage detected by the voltage detection circuit. The control circuit performs control by making a switching between the rectifier circuit and the short circuit according to a operating state relating to the rotation of the rotor of the magneto generator, receives an input of a signal indicating a rpm on a side of the rotor as the operating state relating to the rotation of the rotor of the magneto generator, and on the basis of switching control information containing switching information indicating a relation of the rpm on the side of the rotor with respect to a magnitude relation of an input torque to the magneto generator from the torque supplying device between a short operating mode in which the short circuit is ON and a rectification operating mode in which the short circuit is OFF, makes a switching according to the rpm on the side of the rotor to one of the operating modes in which the input torque to the magneto generator is smaller.

According to the power supply device of the invention, by switching the short circuit between the short operating mode and the rectification operating mode according to a operating state of the rotor or the torque supplying device, an input torque to the magneto generator is reduced, which makes it possible to reduce a operating load on the torque supplying device and hence to reduce energy for rotating the rotor necessary for electric power generation. It thus becomes possible to obtain a power supply device achieving power generation efficiency better than that of the related art.

The foregoing and other object, features, aspects, and advantages of the present invention will become more apparent from the following detailed description of the present invention when taken in conjunction with the accompanying drawings.

DESCRIPTION OF THE PREFERRED EMBODIMENTS

Figure 1:
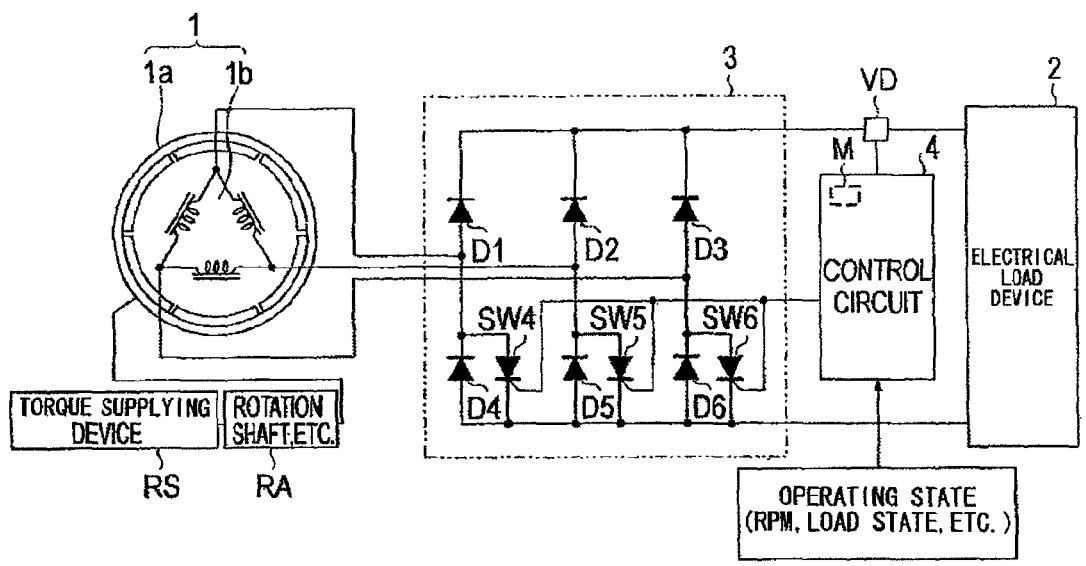
FIG. 1 is a view showing the overall configuration of a power supply device according to a first embodiment of the invention.

Hereinafter, embodiments of the invention will be described in detail with reference to the drawings. Like components are labeled with like reference numerals in the respective drawings.

First Embodiment

FIG. 1 is a view showing the overall configuration of a power supply device according to a first embodiment of the invention.

Referring to FIG. 1, the power supply device of the first embodiment includes a magneto (AC) generator 1, a rectifier circuit 3 that rectifies an AC generated by the magneto generator 1 to a DC, a electrical load device 2 to which electric power rectified to the DC in the rectifier circuit 3 is supplied, a voltage detection circuit VD formed of a voltmeter to find a voltage of the electrical load device 2, thyristors SW4 through SW6 provided to the rectifier circuit 3 and forming a short circuit that electrically shorts an output end of the magneto generator 1, and a control circuit 4 that controls the voltage of the electrical load device 2 to be a first set value according to the voltage detected by the voltage detection circuit VD.

The magneto generator 1 includes a rotor 1a having a magnet divided into a plurality of sections along a rotation direction (circumferential direction) on the inner side of a cylindrical supporting body and a stator 1b having a Δ connected stator winding. The rotor 1a is connected to a rotation shaft RA that transmits rotations of a torque supplying device RS. For example, in the case of a power supply device for vehicle installation, the torque supplying device RS is an internal combustion engine (engine) and the rotor 1a is directly connected to a crank shaft of the internal combustion engine or connected to the rotation shaft RA that is connected to the crank shaft via a belt, a gear or the like.

An AC is generated at the stator winding of the stator 1b as the rotor 1a rotates in association with rotations of the rotation shaft RA. The AC generated on the side of the stator 1b is rectified to a DC by a 3-phase diode bridge formed of six diodes D1 through D6 provided to the rectifier circuit 3.

The electrical load device 2 is a electrical load device, an electrical storage device, or the like, capable of varying an electrical load (power consumption) and formed, for example, of a sensor or an electronic device (ECU) to which electric power rectified to a DC in the rectifier circuit 3 is supplied.

The 3-phase diode bridge in the rectifier circuit 3 has the thyristors SW4, SW5, and SW6 (short circuits) disposed, respectively, between input terminals of three phases inputted from the magneto generator 1 and anode terminals of the diodes D4 through D6 on the negative wave side by defining a direction from the input terminals of three phases to the anode terminals of the diodes D4 through D6 on the negative wave side as the forward direction.

In a case where the voltage of the electrical load device 2 is equal to or higher than the first set value, the control circuit 4 electrically shorts (returns a current at) the output end of the magneto generator 1 by switching ON gate signals of the thyristors SW4, SW5, and SW6 (hereinafter, referred to also as the short operating mode).

In a case where the voltage of the electrical load device 2 is lower than the first set value, the control circuit 4 supplies the electrical load device 2 with a DC via the 3-phase diode bridge in the rectifier circuit 3 by switching OFF the gate signals of the thyristors SW4, SW5, and SW6 (hereinafter, referred to also as the rectification operating mode).

In this manner, the voltage of the electrical load device 2 is adjusted to be the first set value.

Further, the minimum voltage that is necessary to operate electrical load device 2 is defined as a second set value. Then, in a case where the voltage of the electrical load device 2 is lower than the first set value and equal to or higher than the second set value, the control circuit 4 preferentially makes a switching between the short operating mode and the rectification operating mode according to a signal composed of the rpm of the rotor 1a and the like and indicating a operating state of the magneto generator 1 and the torque supplying device RS.

As the signal indicating a operating state, there is a rpm signal from a rpm sensor (not shown) for the rotor 1a. In a case where the power supply device is mounted on a vehicle, this signal can be a rpm signal indicating, for example, a rpm of the crank shaft of the internal combustion engine to which the rotor 1a is directly coupled and obtained from a rpm sensor (not shown) or the electronic control unit (not shown) of the internal combustion engine.

Figure 2:
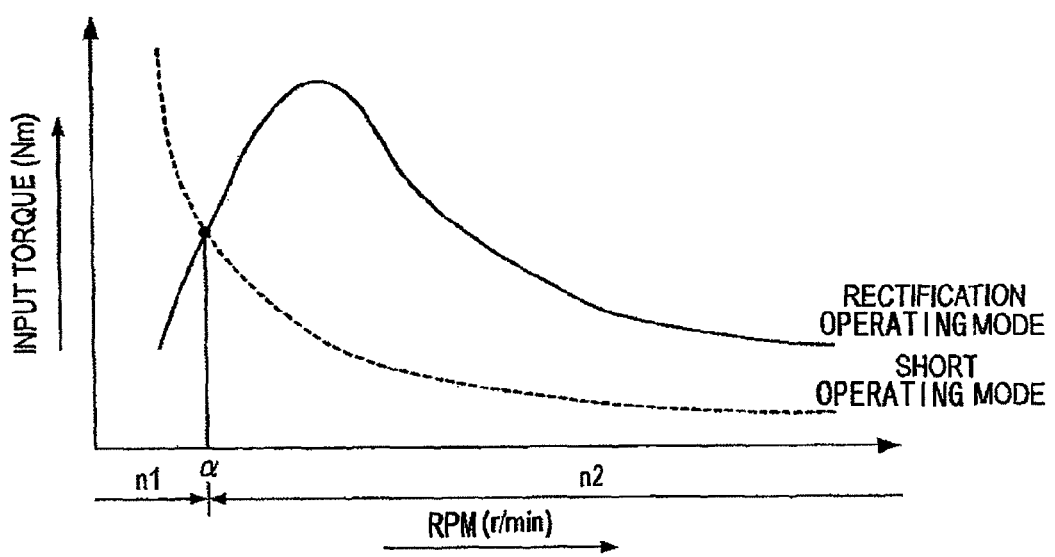
FIG. 2 is a view showing a relation of a rpm and an input torque to a magneto generator according to the first embodiment of the invention.

FIG. 2 shows the characteristic of an input torque to the magneto generator 1 with respect to a rpm of the rotor 1a in the respective operating modes. Referring to FIG. 2, let α be a rpm at the intersection of an input torque in the short operating mode and an input torque in the rectification operating mode, then the input torque (input energy) in the rectification operating mode is smaller than the input torque (input energy) in the short operating mode in an area n1 where the rpm is lower than α. Conversely, in an area n2 where the rpm is equal to or higher than α, the input torque (input energy) in the short operating mode is smaller than the input torque (input energy) in the rectification operating mode. Accordingly, in a case where the voltage of the electrical load device 2 is lower than the first set value and equal to or higher than the second set value, it becomes possible to reduce an input torque to the magneto generator 1 by allowing the short circuits to operate while making a switching between the short operating mode and the rectification operating mode by the control circuit 4 so as to lessen the input torque. Consequently, a load on the torque supplying device RS is reduced and fuel efficiency or the like can be improved in a case where the torque supplying device RS is an internal combustion engine.

To be more concrete, in its internal memory M, the control circuit 4 pre-stores switching control information containing switching information indicating a relation of the rpm of the rotor 1a with respect to a magnitude relation of an input torque from the torque supplying device RS to the magneto generator 1 between the short operating mode and the rectification operating mode as is shown, for example, in FIG. 2 (stores the rpm α). In a case where the voltage of the electrical load device 2 is lower than the first set value and equal to or higher than the second set value, the control circuit 4 makes a switching according to the switching control information, for example, it makes a switching to the rectification operating mode when the rpm is lower than α and to the short operating mode when the rpm is equal to or higher than α. In a case where the voltage of the electrical load device 2 is equal to or higher than the first set value, the control circuit 4 makes a switching to the short operating mode and when the voltage is lower than the second set value, it makes a switching to the rectification operating mode, thereby controlling the voltage of the electrical load device 2 to be the first set value, which is the control target value. Alternatively, in a case where the voltage of the electrical load device 2 is lower than the first set value and equal to or higher than the second set value, it may be configured in such a manner that, for example, the current control is maintained without switching the controls when the rotor 1a is rotating at a rpm at which an input torque to the magneto generator 1 is the same both in the short operating mode and the rectification operating mode.

In a case where, a signal indicating, as a operating state relating to the rotations of the rotor 1a of the magneto generator 1, a operating load state of the torque supplying device RS is inputted into the control circuit 4 and the operating load state of the torque supplying device RS is determined as being a high load state (for example, during acceleration or during hill climbing), the control circuit 4 allows the short circuits to operate by making a switching to the rectification operating mode (area n1) or to the short operating mode (area n2) depending on whether the rpm is in the area n1 or n2. An input torque to the magneto generator 1 is thus reduced, which in turn makes it possible to reduce a load on the torque supplying device RS. In a case where the torque supplying device RS is an internal combustion engine in a vehicle, acceleration performance and hill-climbing performance can be enhanced.

In a case where the operating load state of the torque supplying device RS is determined as being a low load state (for example, during deceleration and idle running or during hill descending), the control circuit 4 allows the short circuits to operate by making a switching to the short operating mode (area n1) or to the rectification operating mode (area n2) depending on whether the rpm is in the area n1 or n2. An input torque to the magneto generator 1 is thus increased, which in turn makes it possible to increase a load on the torque supplying device RS. In a case where the torque supplying device RS is an internal combustion engine in a vehicle, braking power during deceleration can be enhanced.

In a case where the torque supplying device RS described above is an internal combustion engine, at least one of signals respectively indicating, for example, an intake tube internal pressure of the internal combustion engine, a throttle opening degree of the internal combustion engine, and a temperature of cooling water that cools the internal combustion engine, obtained from the electronic control unit of the internal combustion engine, or the like, is inputted into the control circuit 4 to determine the operating load sate. The operating load state is determined according to one of these signals or a combination of a plurality of these signals.

Figure 3:
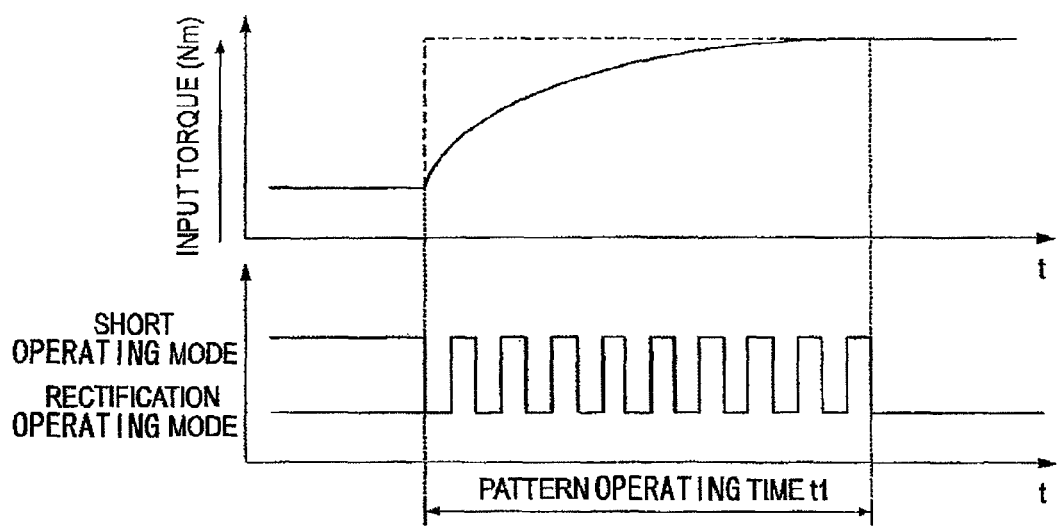
FIG. 3 is a view showing a relation of operating mode switching timing and an input torque to the magneto generator according to the first embodiment of the invention.

Further, as is shown in FIG. 3, by providing a switching pattern and a pattern operating time t1 to the timing at which a switching is made between the short operating mode and the rectifier operating mode, it becomes possible to prevent an abrupt change of an input torque to the magneto generator 1.

Referring to FIG. 3, the abscissa is used for the time and the ordinate is used for an input torque to the magneto generator 1 and the operating modes.

As is shown in FIG. 3, for example, in a case where the operating mode is switched from the short operating mode to the rectification operating mode, an abrupt change of an input torque to the magneto generator 1 can be prevented by providing a switching pattern by which the short operating mode and the rectification operating mode are switched alternately during the pattern operating time t1. The switching pattern and the pattern operating time t1 may be varied with the rpm of the rotor 1a. In a case where the switching pattern and the pattern operating time t1 are provided to the operating mode switching timing, the switching control information (switching pattern and pattern operating time t1) is pre-stored in the memory M in the control circuit 4 (hereinafter, the same applies to similar cases).

The magnitude relation of an input torque to the magneto generator 1 from the torque supplying device RS between the short operating mode and the rectification operating mode and the respective corresponding areas may be provided in the form of a table indicating the range of rpm. For example, the relation of the rpm of the rotor 1a and an input torque (Nm) to the magneto generator 1 shown in FIG. 2 is found preliminarily by measurement or the like, and a table is created from the relation and stored in the memory M in the control circuit 4 as the switching control information.

Second Embodiment

Figure 4:
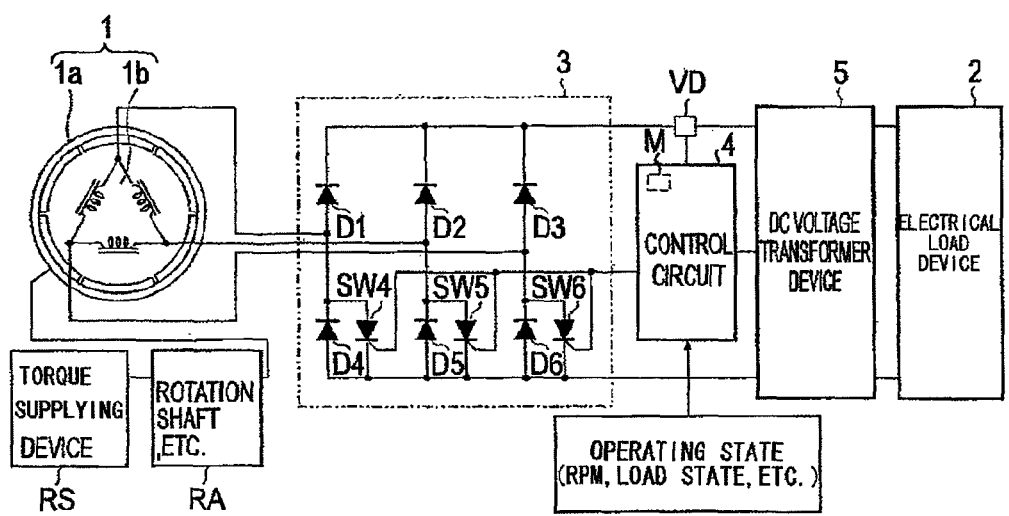
FIG. 4 is a view showing the overall configuration of a power supply device according to a second embodiment of the invention.

FIG. 4 is a view showing the overall configuration of a power supply device according to a second embodiment of the invention. The power supply device of the second embodiment is of the configuration same as the configuration of the first embodiment above except that a DC voltage transformer device 5 that is capable of varying a transformation ratio and transforms an output voltage of the rectifier circuit 3, Vrout, to a voltage between input terminals of the electrical load device 2, Vbin, is additionally provided.

Figure 5:
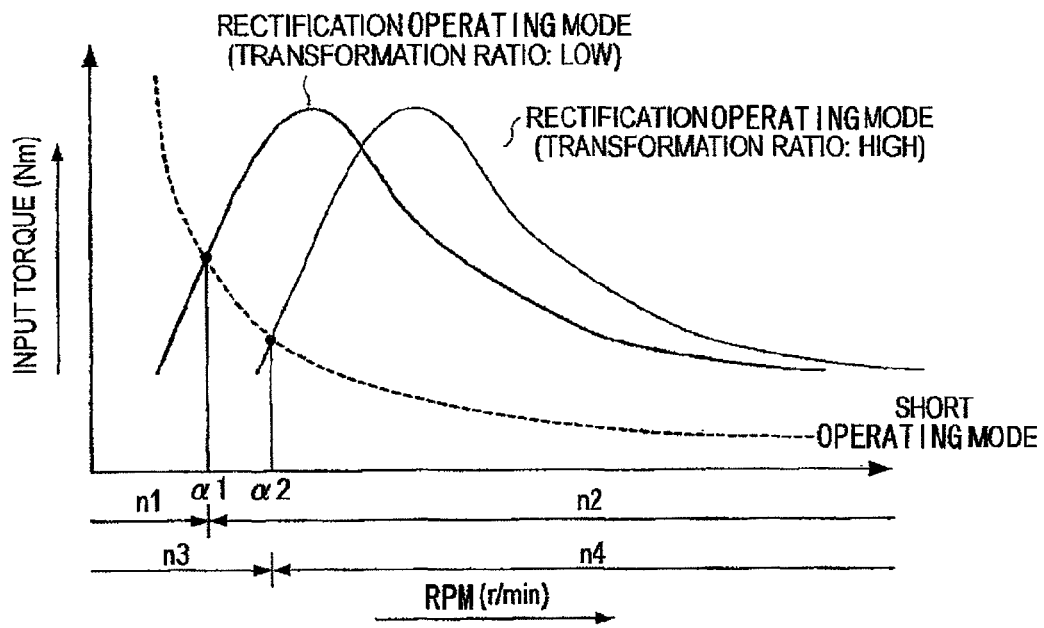
FIG. 5 is a view showing a relation of a rpm and an input torque to a magneto generator according to the second embodiment of the invention.

FIG. 5 shows the characteristic of an input torque to the magneto generator 1 with respect to a rpm of the rotor 1a in the respective operating modes in the second embodiment.

An input torque to the magneto generator 1 in the rectification operating mode varies with a transformation ratio (Vbin/Vrout) of the DC voltage transformer device 5. Referring to FIG. 5, let α1 be a rpm at the intersection of an input torque in the short operating mode and an input torque in the rectification operating mode (transformation ratio: low) and α2 be a rpm at the intersection of an input torque in the short operating mode and an input torque in the rectification operating mode (transformation ratio: high). Then, when the transformation ratio of the DC voltage transformer device 5 is low, an input torque (input energy) in the rectification operating mode is smaller than an input torque (input energy) in the short operating mode in an area n1 where the rpm is smaller than α1. Conversely, an input torque (input energy) in the short operating mode is smaller than an input torque in the rectification operating mode in an area n2 where the rpm is equal to or higher than α1.

Hence, by allowing the short circuits to operate while making a switching between the rectification operating mode and the short operating mode by the control circuit 4 depending on whether the rpm is in the area n1 or n2, it becomes possible to reduce an input torque to the magneto generator 1.

When the transformation ratio of the DC voltage transformer device 5 is high, an input torque (input energy) in the rectification operating mode is smaller than an input torque (input energy) in the short operating mode in an area n3 where the rpm is lower than α2. Conversely, an input torque (input energy) in the short operating mode is smaller than an input torque (input energy) in the rectification operating mode in an area n4 where the rpm is equal to or higher than α2.

Hence, by allowing the short circuits to operate while making a switching between the short operating mode and the rectification operating mode by the control circuit 4 depending on the whether the rpm is in the area n3 or n4, it becomes possible to reduce an input torque to the magneto generator 1.

Consequently, a load on the torque supplying device RS is reduced and the fuel efficacy or the like is enhanced in a case where the torque supplying device RS is an internal combustion engine.

The magnitude relation of an input torque to the magneto generator 1 from the torque supplying device RS between the short operating mode and the rectification operating mode at the respective transformation ratios and the respective corresponding areas may be provided in the form of a table indicating the range of rpm. For example, the relation of the rpm of the rotor 1a and an input torque (Nm) to the magneto generator 1 shown in FIG. 5 is found preliminarily by measurement or the like, and a table is created from the relation and stored in the memory M in the control circuit 4 as the switching control information.

Third Embodiment

Figure 6:
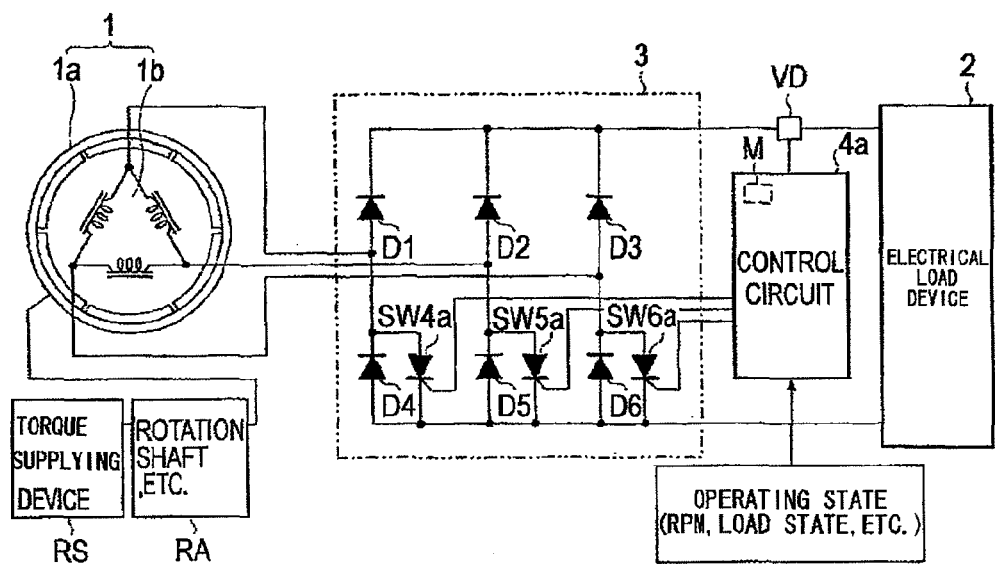
FIG. 6 is a view showing the overall configuration of a power supply device according to a third embodiment of the invention.

FIG. 6 is a view showing the overall configuration of a power supply device according to a third embodiment of the invention. The power supply device of the third embodiment is of the configuration same as the configuration of the first embodiment above except that the control circuit 4 is replaced by a control circuit 4a and the thyristors SW4 through SW6 are replaced by thyristors SW4a through SW6a, which are short circuit. Herein, the control circuit 4a performs ON and OFF control independently on the respective gate signals of the thyristors SW4a through SW6a.

Figure 7:
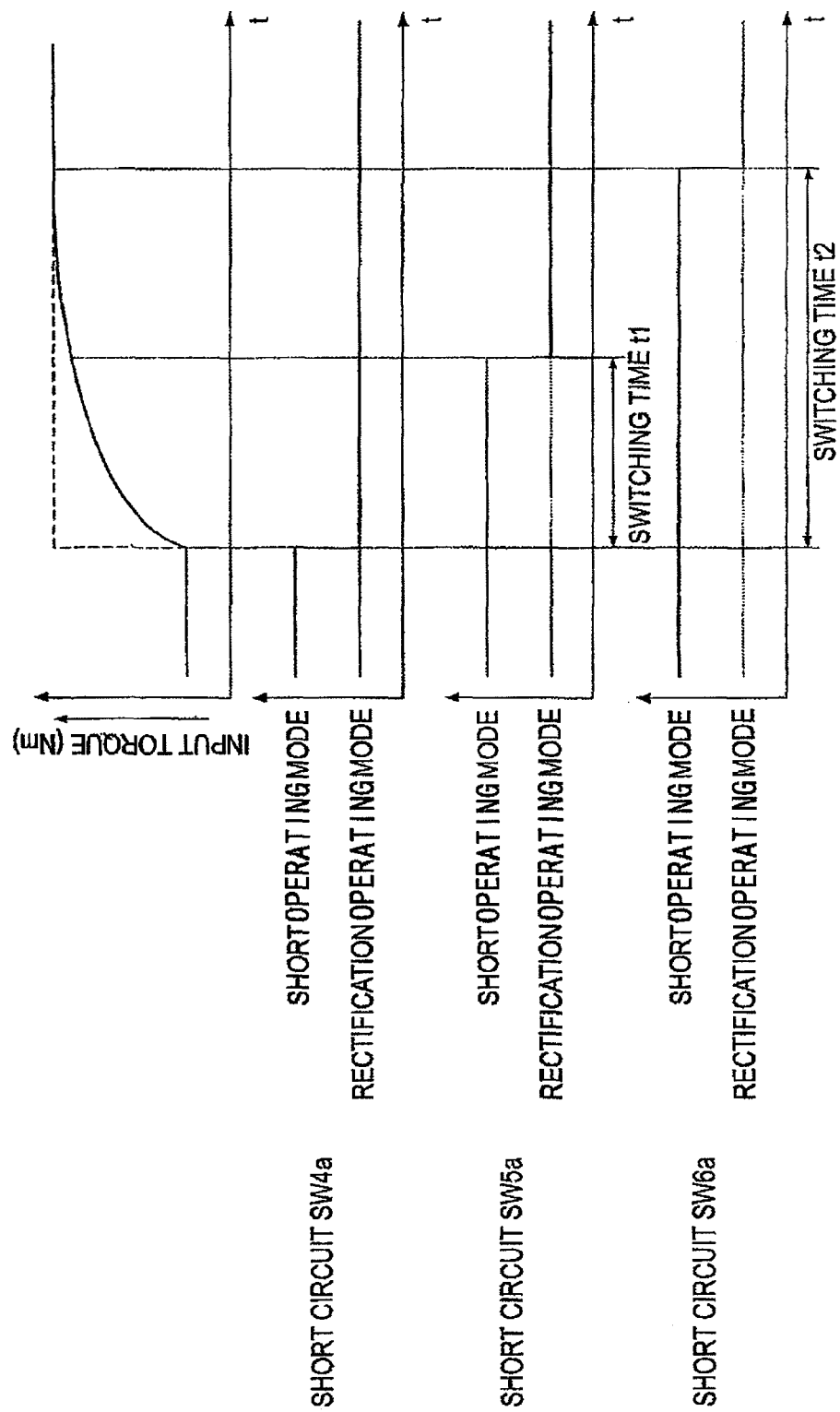
FIG. 7 is a view showing a relation of operating mode switching timing and an input torque to a magneto generator according to the third embodiment of the invention.

FIG. 7 shows the characteristic of an input torque to the magneto generator 1 with respect to timing at which a switching is made between the short operating mode and the rectification operating mode in the respective thyristors (short circuits) SW4a, SW5a, and SW6a of the third embodiment.

As is shown in FIG. 7, a switching time is provided to the timing at which the respective short circuits SW4a through SW6a are switched from the short operating mode to the rectification operating mode. Herein, by setting the switching time of the short circuit SW4a and the short circuit SW5a to t1 and the switching time of the short circuit SW4a and the short circuit SW6a to t2, it becomes possible to prevent an abrupt change of an input torque to the magneto generator 1.

The switching times t1 and t2 may be varied with the rpm of the rotor 1a. In a case where the switching times t1 and t2 are provided to the operating mode switching timing, the switching control information (switching times t1 and t2) is pre-stored in the memory M in the control circuit 4a.

Of the short circuits SW4a through SW6a, the control circuit 4a makes a switching between the short operating mode and the rectification operating mode according to the switching control information, for example, for the short circuit SW4a alone and does not make a switching between the short operating mode and the rectification operating mode for the remaining short circuits SW5a and SW6a. In this manner, an abrupt change of an input torque to the magneto generator 1 can be prevented.

In the respective embodiments described above, the switching control information in each embodiment is stored in the memory M in the control circuit 4 or 4a. It should be appreciated, however, that the invention is not limited to this configuration. For example, it may be configured in such a manner that a comparison circuit (not shown) formed using an FV converter or a comparator is provided while a rpm signal from the outside is subjected to frequency-to-voltage conversion to compare the resulting voltage with a reference voltage indicating a predetermined rpm α, α1, α2 or the like, and the comparison result is used as the switching control information for the control circuit 4 or 4a.

Figure 8:
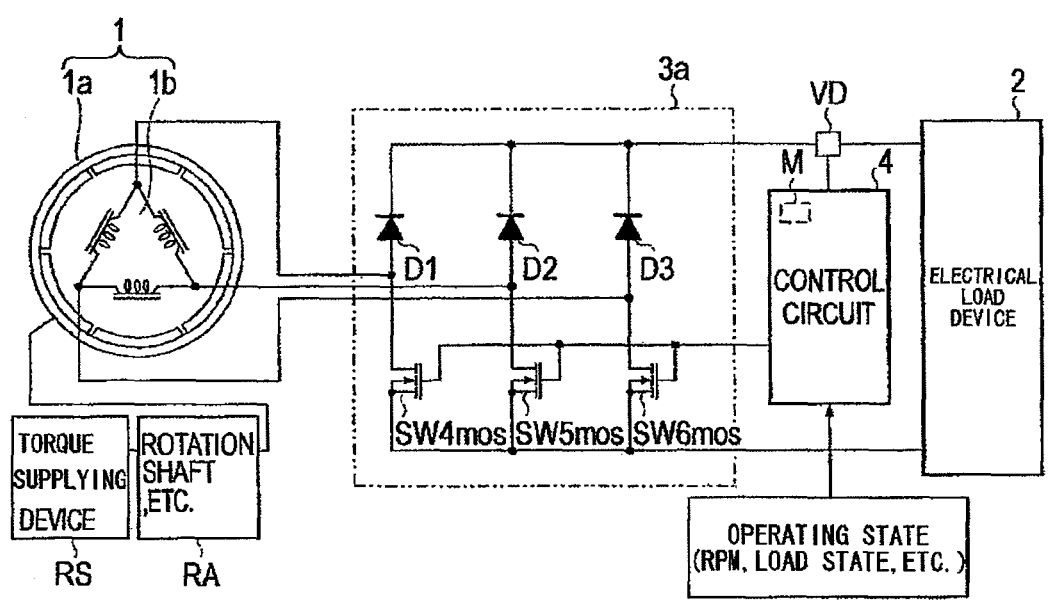
FIG. 8 is a view showing the overall configuration of a power supply device using a rectifier circuit of a different configuration as a modification of the first embodiment.

In the respective embodiments above, the thyristors SW4 through SW6 (SW4a through SW6a) are disposed, respectively, between the input terminals of three phases inputted from the magneto generator 1 and the anode terminals of the diodes D4 through D6 on the negative wave side by defining a direction from the input terminals of three phases to the anode terminals of the diodes D4 through D6 on the negative wave side as the forward direction. It should be appreciated, however, that the invention is not limited to this configuration. For example, as is shown in a rectification circuit 3a of FIG. 8, the diodes D4 through D6 on the negative wave side in the 3-phase diode bridge may be replaced by transistors SW4mos through SW6mos formed of MOSFETs furnished with a rectification function and a short function.

Various modifications and alterations of this invention will be apparent to those skilled in the art without departing from the scope and spirit of this invention, and it should be understood that this is not limited to the illustrative embodiments set forth herein.

What is claimed is:

1. A power supply device comprising:
a magneto generator that is formed of a rotor having a magnet that creates a magnetic field and a stator generating an AC at a stator winding by a rotation of the rotor;
a torque supplying device that supplies torque to the rotor of the magneto generator;
a rectifier circuit that supplies electric power to a electrical load device by rectifying the AC generated by the magneto generator to a DC;
a short circuit that has an ON-and-OFF controllable switching element and electrically shorts an output end of the magneto generator when the switching element is switched ON;
a voltage detection circuit that detects a terminal voltage of the electrical load device; and
a control circuit that controls a voltage of the electrical load device to be a first set value by ON and OFF control on the switching element of the short circuit according to the voltage detected by the voltage detection circuit,
wherein the control circuit performs control by making a switching between the rectifier circuit and the short circuit according to a operating state relating to the rotation of the rotor of the magneto generator, receives an input of a signal indicating a rpm on a side of the rotor as the operating state relating to the rotation of the rotor of the magneto generator, and on the basis of switching control information containing switching information indicating a relation of the rpm on the side of the rotor with respect to a magnitude relation of an input torque to the magneto generator from the torque supplying device between a short operating mode in which the short circuit is ON and a rectification operating mode in which the short circuit is OFF, makes a switching according to the rpm on the side of the rotor to one of the operating modes in which the input torque to the magneto generator is smaller.

2. The power supply device according to claim 1, wherein:
a minimum voltage that is necessary to operate electrical load device is defined as a second set value, and in a case where the voltage detected by the voltage detection circuit is lower than the first set value and equal to or higher than the second set value, the control circuit makes a switching according to the rpm on the side of the rotor to one of the operating modes in which the input torque to the magneto generator is smaller.

3. The power supply device according to claim 1, wherein:
a signal indicating, as the operating state relating to the rotation of the rotor of the magneto generator, a operating load state of the torque supplying device is inputted into the control circuit, and when the torque supplying devices is in a high load state, the control circuit makes a switching according to the rpm on the side of the rotor to one of the operating modes in which the input torque to the magneto generator is smaller.

4. The power supply device according to claim 1, wherein:
a signal indicating, as the operating state relating to the rotation of the rotor of the magneto generator, a operating load state of the torque supplying device is inputted into the control circuit, and when the torque supplying device is in a low load state, the control circuit makes a switching according to the rpm on the side of the rotor to one of the operating modes in which the input torque to the magneto generator is larger.

5. The power supply device according to claim 3, wherein:
the torque supplying device is an internal combustion engine;
the signal indicating the operating load state of the torque supplying device is at least one of signals respectively indicating an intake tube internal pressure, a throttle opening degree, and a temperature of cooling water of the internal combustion engine; and
the operating load state is determined according to one of the signals or a combination of a plurality of the signals.

6. The power supply device according to claim 4, wherein:
the torque supplying device is an internal combustion engine;
the signal indicating the operating load state of the torque supplying device is at least one of signals respectively indicating an intake tube internal pressure, a throttle opening degree, and a temperature of cooling water of the internal combustion engine; and
the operating load state is determined according to one of the signals or a combination of a plurality of the signals.

7. The power supply device according to claim 1, wherein:
the control circuit makes a switching between the short operating mode and the rectification operating mode according to the switching control information in which a switching pattern and a pattern operating time are provided to timing at which a switching is made between the short operating mode and the rectification operating mode.

8. The power supply device according to claim 7, wherein:
the control circuit makes a switching between the short operating mode and the rectification operating mode according to the switching control information in which the switching pattern and the pattern operating time provided to the timing at which a switching is made between the short operating mode and the rectification operating mode varies with the rpm on the side of the rotor.

9. The power supply device according to claim 1, further comprising:
a DC voltage transformer device that is able to change a transformation ratio and transforms a DC output voltage of the rectifier circuit to a voltage between input terminals of the electrical load device,
wherein the control circuit makes a switching according to the rpm on the side of the rotor to one of the operating modes in which the input torque to the magneto generator is smaller on the basis of control switching information containing switching information indicating a relation of the rpm on the side of the rotor with respect to the transformation ratio of the DC voltage transformer device and a magnitude relation of the input torque to the magneto generator from the torque supplying device between the short operating mode and the rectification operating mode.

10. The power supply device according to claim 1, wherein:
the rectifier circuit is formed of a 3-phase diode bridge and the short circuit includes a plurality of short circuits provided for respective phases and the control circuit controls the short circuits in the respective phases independently.

* * * * *